United States Patent
Griffin et al.

(10) Patent No.: US 8,661,832 B2
(45) Date of Patent: Mar. 4, 2014

(54) SURGE MARGIN REGULATION

(75) Inventors: Ian A. Griffin, Sheffield (GB); Arthur L. Rowe, Derby (GB)

(73) Assignee: Rolls-Royce PLC, London (GB)

( * ) Notice: Subject to any disclaimer, the term of this patent is extended or adjusted under 35 U.S.C. 154(b) by 817 days.

(21) Appl. No.: 12/844,146

(22) Filed: Jul. 27, 2010

(65) Prior Publication Data

US 2011/0056210 A1  Mar. 10, 2011

(30) Foreign Application Priority Data

Sep. 8, 2009 (GB) .................................. 0915616.7

(51) Int. Cl.
*F02C 7/04* (2006.01)
*F02C 9/18* (2006.01)
*F02C 9/20* (2006.01)

(52) U.S. Cl.
USPC ............ 60/779; 60/795; 60/39.091; 137/15.2

(58) Field of Classification Search
USPC .................... 60/779, 795, 39.091, 39.23, 794; 137/15.2

See application file for complete search history.

(56) References Cited

U.S. PATENT DOCUMENTS

| | | | |
|---|---|---|---|
| 5,594,665 A | | 1/1997 | Walter et al. |
| 5,915,917 A | * | 6/1999 | Eveker et al. ...................... 415/1 |
| 6,059,522 A | * | 5/2000 | Gertz et al. ......................... 415/1 |
| 6,098,010 A | * | 8/2000 | Krener et al. .................. 701/100 |
| 6,755,025 B2 | * | 6/2004 | Eleftheriou et al. ............. 60/795 |
| 6,820,429 B2 | * | 11/2004 | Meisner ........................... 60/773 |
| 2002/0161550 A1 | | 10/2002 | Bharadwaj et al. |
| 2007/0137214 A1 | * | 6/2007 | Zewde et al. .................... 60/782 |
| 2008/0155989 A1 | | 7/2008 | Roth |

FOREIGN PATENT DOCUMENTS

| | | |
|---|---|---|
| EP | 1 788 223 A2 | 5/2007 |
| GB | 2 273 316 A | 6/1994 |

OTHER PUBLICATIONS

British Search Report dated Jan. 11, 2010 in British Patent Application No. GB0915616.7.

* cited by examiner

*Primary Examiner* — Ehud Gartenberg
*Assistant Examiner* — Karthik Subramanian
(74) *Attorney, Agent, or Firm* — Oliff PLC

(57) ABSTRACT

The present invention relates to control of engine variable of a gas turbine engine to regulate the surge margins of at least two compressors. A controller (20) receives data measured from engine sensors (22, 23) and uses said data to determine an indication of surge margin for each of at least two compressors (6, 7) of the gas turbine engine. The controller (20) uses the indications of surge margin for each of the compressors to determine a control strategy that balances the requirements of each compressor. In one embodiment a surge margin operating map divided into different control domains (40, 43, 43) is used. The indication of surge margin determined for each compressor is plotted to determine which control domains the current operating point on the surge margin operating map falls within. The invention is particularly suited to control binary bleed valves associated with the compressors and the position of the current operating point in a control domain and/or the time spent in the operating domain can be used to determine how many of the binary valves should be opened or closed.

16 Claims, 2 Drawing Sheets

US 8,661,832 B2

SURGE MARGIN REGULATION

This invention relates to apparatus and methods for control of variable parameters of a gas turbine engine to prevent surge.

Surge is a known potential problem in operation of a gas turbine engine relating to the operating conditions of the compressor. A gas turbine engine has one or more compressors arranged to pressurize air to an extent where it can be mixed with fuel and ignited. The combustion gases drive one or more downstream turbines, which power the compressors.

It will be appreciated that, in normal operation, the action of the compressor causes the pressure at the outlet of the compressor to be greater than that at the inlet. The ability of a compressor to act satisfactorily depends upon factors such as the pressure ratio, ie the ratio of outlet pressure to inlet pressure for that compressor, and the mass flow through the compressor. Simplistically, at relatively high pressure ratios a greater mass flow is required for the compressor to function stably. If the pressure ratio is too high for the current mass flow the compressor may start to stall with a loss of even airflow. If the airflow stalls to a sufficient degree the higher pressure at the outlet of the compressor can cause reverse airflow, which is known as surge. Engine surge can result in loss of thrust, vibration and damage to the engine and should be avoided.

To reduce the potential for surge a typical gas turbine engine is arranged with valves, called bleed valves, associated with the compressor. The bleed valves can be opened to bleed some air from the core airflow and either re-circulate the air or vent it to a bypass duct. This can reduce the pressure ratio and hence reduce the likelihood of surge. The bleed valves are typically controlled based on a measure of engine/compressor speed. The compressor may also be provided with inlet guide vanes, the positioning of which can be varied to change the pressure characteristics. The trimming of such vanes is usually also controlled based on engine/compressor speed. Control based on engine/compressor speed is relatively crude and can lead to inefficiency in engine usage. Clearly when the bleed valves are open some of the air pressurized by the compressor is vented to a lower pressure environment and so some of the work of the compressor is wasted.

U.S. Patent Application Publication No. 2008/0155989 describes a system for controlling the operating lines of a gas turbine engine which includes a bleed system. A closed loop feedback control system is described to control the bleed system based on the input from sensors of flow parameters of the compressor system. This system uses measured engine flow parameters to modulate the valves in a bleed system and so is responsive to actual flow conditions. The system described however uses valves which are capable of modulating the airflow whereas some gas turbine engines use valves which are either open or closed, ie binary in nature, and the control system described may not be suitable for controlling a bleed system having binary valves. Further the system described controls the operating line of a single compressor. Some gas turbine engines have more than one core compressor.

U.S. Patent Application Publication No. 2002/0161550 describes an apparatus for monitoring the health of a compressor having at least one sensor operatively coupled to the compressor for monitoring the compressor and a processor running a stall precursor detection algorithm. If the measured parameters indicate a stall precursor corrective action is taken. This requires use of rapid reacting hardware to implement the necessary changes, given the timescales of stall events. Further, this apparatus is again suitable for a single compressor only.

It is therefore an object of the present invention to provide methods and apparatus for control of engine parameters to reduce the risk of stall/surge which mitigate at least some of the above mentioned disadvantages.

Thus according to the present invention there is provided an apparatus for controlling a gas turbine engine comprising a plurality of compressors, the apparatus comprising: a controller having an input for receiving at least one measured engine parameter and an output for transmitting control signals for controlling engine variables; wherein the controller is configured to determine, from said at least one measured engine parameter, an indication of surge margin for each of at least two compressors, and generate at least one control signal for controlling at least one engine variable based on said determined indications of surge margin.

This aspect of the present invention therefore provides an apparatus which can balance the potentially competing requirements of two or more compressors of a gas turbine engine and provide control that actively regulates the surge margins of the at least two compressors. Actively regulating the surge margins provides improved control over the operation of the gas turbine engine and minimizes the risk of surge for any of the compressors.

The controller receives measured engine parameters and determines for each of at least two compressors an indication of surge margin. Surge margin is, as the skilled person will appreciate, a measure of how close the current operating conditions of the compressor are to surge, for example as determined by a surge function or the surge line on the operating map for the compressor. It will be appreciated that there are various different ways in which surge margin can be determined but in each case surge margin represents how close the current operating conditions of the compressor are to a predetermined surge condition. The surge margin may sometimes be referred to as a stall margin, ie a measure of how close the operating conditions of the compressor are to stall conditions and for the purposes of this specification determining a surge margin for a compressor may comprise determining a stall margin, or indeed determining a margin between the current operating point of the compressor and a boundary line indicating a boundary between stable and unstable operating conditions for a compressor.

The indication of surge margin may comprise a value of surge margin that is determined for the relevant compressor. In other words the controller may directly estimate a current surge margin for the compressor. Alternatively the indication of surge margin may be a parameter which is related to and varies with the value of surge margin, for example a value which is proportional (or inversely proportional) to the surge margin.

The controller determines an indication of surge margin for each of at least two compressors, ie at least first and second surge margins are determined for first and second compressors of the engine respectively. This gives an indication of how close each compressor is to surge conditions. This allows the controller to employ a control strategy that balances the requirements of the first and second compressors.

The apparatus may be used for control of any gas turbine with more than one compressor but is particularly suitable for control of turbines having two core compressors. It will be appreciated that a turbofan or ducted fan gas turbine engine, such as commonly used for aviation jet engines, comprises a fan upstream of a high pressure compressor. The fan does pressurize air but most of the pressurized air is directed through by-pass ducts around the core of the engine to provide thrust from the engine. Some air flow is directed into the core airflow of the engine and the fan may also be arranged with a low pressure compressor and/or booster on the same shaft or spool. Downstream in the core air flow will be a high pressure core compressor on a separate shaft to the fan and any low pressure compressor. Some turbine engines also have another independent core compressor between the fan and the high pressure (HP) compressor, ie an intermediate pressure (IP) compressor arranged on a shaft which is separate to that of the fan and the high pressure compressor. The IP and HP compressors are core compressors in that their inlets and outlets are wholly within the core airflow and their operation affects the core airflow only. The operating conditions of these compressors depend on the flow through the core and they may have competing requirements. The apparatus of the present invention can determine an indication of surge margin for each of the IP and HP compressors and thus can devise a control strategy which minimises risk of surge to either compressor.

For example, consider an engine having a core IP compressor and a downstream core HP compressor wherein the control signals are used to control the opening or closing of bleed valves located between the IP and HP compressors. If the IP compressor has a low surge margin, indicating that the IP compressor is operating near surge conditions, the bleed valves could be opened to decrease the pressure ratio for the IP compressor. However, opening bleed valves between the IP and HP compressor may result in a decrease in mass flow and/or an increase in pressure ratio for the HP compressor. If the surge margin for the HP compressor is relatively high, indicating the HP compressor is not near surge conditions, the controller may generate control signals to open the bleed valves. If however the surge margin for the HP compressor is low itself, the controller may not open the bleed valves between the IP and HP compressor as such action could increase the risk of surge for the HP compressor. The controller may generate control signals to take other action however, such as opening bleed valves associated with the HP compressor to increase its surge margin.

As mentioned the apparatus of this aspect of the present invention is therefore particularly suitable for control of a turbine engine having two core compressors which are independent of the fan and is particularly suitable for control of the intermediate pressure and high pressure compressors in a three shaft gas turbine engine. The apparatus would also be suitable for use in engine designs having more than two core compressors. Also the controller may determine the surge margin for each of more than two compressors.

The controller may generate a variety of control signals based on the determined indication of surge margin for the compressors. The control signals may comprise bleed valve control signals for control of at least one set of bleed valves of the gas turbine engine. As mentioned above typical gas turbine engines have sets of bleed valves associated with the compressor or compressors and the control signal may control one or more of said sets of bleed valves. Various arrangements of bleed valves are known. There may be one or more sets of bleed valves located at different axial points in the core airflow. For instance a set of bleed valves may be located immediately after a compressor. Where a compressor is a multi-stage compressor there may a set of bleed valve between two stages of a compressor. Each set of bleed valves may comprise one or more bleed valves. One or more bleed valves may have binary actuators, ie the individual valve is either open or closed. As used in this specification the term binary bleed valve shall refer to a valve which is operable so as to be either open or closed. Alternatively a bleed valve may be a valve which can modulate the airflow, ie can be varied to modulate the airflow between fully open and fully closed.

The bleed valve control signal will be appropriate to the type of bleed valve. In one embodiment of the invention, where one or more sets of bleed valves comprise a plurality of binary bleed valves, the bleed valve control signal may comprise a signal for controlling the number of bleed valves which are open in a set of bleed valves based on the determined indication of surge margins. In other words the control signal may result in all, none or only some of the bleed valves in the set being open, the number of open valves being set by the bleed valve control signal. Depending on the arrangement of bleed valves it may be possible to open or close each bleed valve in a set independently of the other bleed valves in a set. In some arrangements however it may be necessary to open or close subsets of the binary bleed valves together. The ability to control sets of bleed valves comprising a plurality of binary bleed valves is a particular advantage of the apparatus of this aspect of the invention.

The controller determines the appropriate control signals based on the indication of surge margin for the at least two compressors. The controller balances the potentially conflicting requirements of the compressors based on a predetermined strategy. In one embodiment the controller uses the indications of surge margin to determine where the current operating point of the engine lies on a surge margin operating map comprising a plurality of control domains. The surge margin operating map is a multi-dimensional map with one dimension for each compressor for which an indication of surge margin is determined. For example where the controller determines an indication of surge margin for each of two compressors, eg an IP compressor and an HP compressor, the surge margin operating map is a two dimensional map with the indication of surge margin of the IP compressor on one axis and the indication of surge margin for the HP compressor on the other axis. The current operating point of the engine, as determined by the indication of surge margin determined for each compressor, may be plotted on this map. The surge margin operating map is divided into a plurality of control domains which identify a control action to be taken, which may include one or more domains indicating that the current engine settings should be maintained.

As an example consider that the controller determines an indication of surge margin for each of an IP compressor and an HP compressor and determines the current engine operating position on a surge margin operating map. The surge margin operating map has various control domains indicating a control action for controlling one or more sets of bleed valves, for instance a set of bleed valves located between the IP and HP compressors. There may for instance be a close bleed valves domain and an open bleed valves domain. There may also be a no change control domain. If the operating point on the surge margin operating map is within the close bleed valves domain a control signal to close the bleed valves is generated. Similarly if the operating point is within the open bleed valves domain the controller generates a control signal to open the bleed valves and if the operating point is within the no change control domain the current bleed setting, whatever it is, is maintained.

The shape, size and positioning of the various control domains within the surge margin operating map is predefined and stored in the controller and adapted to provide an appropriate control strategy for the particular engine. The control domains may be based on test data obtained from engine testing. In general the control domains may be arranged to balance the risk of surge from each of the at least two compressors and also to maximise efficiency.

The use of a surge margin operating map is particularly suited to control of a set of bleed valves which comprises a plurality of binary valves. Control over the number of valves in the set which are opened (or closed) may be based on the position of the current operating point within the surge margin operating map. For example, the control domains may comprise various sub-domains indicating a particular binary bleed valve setting. For instance there may be separate control sub-domains for different numbers of bleed valves being open, eg a domain indicating that no bleed valves are open, a different domain indicating that only one bleed valve (or one sub-set of bleed valves) should be open, another domain indicating two bleed valves (or two subsets of bleed valves) should be open etc. through to a domain indicating that all bleed valves should be open. There may be a no change control domain located in the surge margin operating map between the domain indicating no bleed valves should be open and the sub-domain indicating a minimum number of bleed valves should be open. Instead of defining control sub-domains for each different setting of binary bleed valves a distance of the current operating point from the boundary of the relevant domain or a defined operating line could be compared to a threshold and used to determine the number of binary valves, or subsets of binary valves, that should be open or closed.

Additionally or alternatively the length of time the operating point has spent within an control domain may be used to control the opening or closing of bleed valves in a set of binary bleed valves. For example if the operating point of the engine in the surge operating map is determined to lie within a control domain indicating that a particular set of bleed valves should be opened a first bleed valve (or subset) of the set may be opened. If the operating point remains in the same control domain for a certain period of time an additional bleed valve of the set is opened.

Preferably both the distance from a boundary line of the domain and the time spent in the domain are used to determine the appropriate control signal. In one embodiment, the controller comprises an integrator and the controller is configured to determine the distance of the current operating point of the engine in the surge margin operating map from a defined line, eg a boundary of the control domain the operating point lies within, and to supply the distance as an input to the integrator. The output of the integrator may be used to determine the control signal. For instance, for each set of binary valves a threshold may be set for an individual valve or subset of valves. If the operating point of the engine within the surge margin operating map lies within a control domain indicating that a particular set of valves should be opened the output of the integrator may be compared to the threshold for each valve or subset of valves and the valve toggled appropriately when the relevant threshold is reached.

The principle of determining a current operating point within a surge margin operating map may also be used for control of modulating bleed valves, with different control domains indicating the action to be taken and the distance from an operating line used to set the amount of modulation for example.

Other arrangements for determining the appropriate control signals based on the indication of surge margin for the at least two compressors may be used either in addition, or as an alternative, to use of a surge margin operating map. For example where the engine comprises modulating bleed valves which can be set to one or more interim positions between open and closed, the controller may comprise a control system having a target representing a desired surge margin or minimum surge margin for each compressor. The difference between the determined indication of surge margin and the target may be used in a feedback control loop arranged to keep both surge margins as close to target as possible.

The control signals may comprise guide vane control signals for controlling one or more sets of variable guide vanes associated with at least one of the compressors. Some compressors may be provided with variable inlet guide vanes or variable stator vanes (VSVs), the orientation of which can be varied. Changing the orientation of the vanes can change the pressure and flow characteristics and VSV control is often used during engine transients, ie during periods of acceleration or deceleration. The controller of this aspect of the present invention may generate control signals for controlling variable vanes.

The controller is preferably configured, during engine operation, to continually determine an indication of surge margin for each of the at least two compressors and to generate appropriate control signals during operation. In particular the control signals may be bleed valve control signals. In other words the apparatus of this aspect of the invention provides continuous monitoring of the surge margins of each of the at least two compressors. If the indication of surge margin indicates that the surge margin for any compressor is becoming too low, control signals can be generated to take corrective action, for instance by opening any necessary bleed valves. The apparatus of the present invention therefore does not simply react to a possible stall or surge event but provides continuous, active regulation of the surge margins of at least two compressors of the engine. The controller can open the bleed valves when necessary only to the extent necessary to regulate the surge margins of the compressors, within the resolution offered by a binary bleed valve system. Thus the apparatus of this aspect of the present invention operates to prevent a possible stall or surge event becoming likely. As continuous, active regulation is employed, through all phases of engine operation, the need for rapidly reacting control hardware, for instance high bandwidth communication lines and the like, is largely avoided. By continuous it is meant that the surge margins for the compressors are regularly determined during engine operation, for instance at a predefined sampling interval, and any control signals generated as necessary.

In one embodiment some control signals may only be generated during certain modes of engine operation. For instance, whilst continuous regulation of surge margins may be provided by control over one or more sets of bleed valves, control signals for controlling the position of inlet guide vanes may only typically be generated during engine transients or the like.

Whilst the controller of the present invention is particularly suited to generating bleed valve control signals for controlling compressor bleed valves and vane control signals for controlling variable guide vanes or variable stator vanes, it will be appreciated that other engine variables may additionally or alternatively be controlled to reduce potential surge conditions. For example the controller may generate a fuel control signal that controls fuel flow to reduce surge risk and/or a control signal for controlling the size of a variable outlet nozzle within the core airflow.

The indication of surge margin for each compressor is determined using measured engine parameters. The skilled person will appreciate that various engine parameters may be used to determine an indication of surge margin for a particular compressor.

In one embodiment the indication of surge margin for a compressor is determined on the basis of corrected compressor outlet flow. A surge outlet flow function is defined for each compressor as a function of compressor corrected speed. Measured engine parameters are used to determine, for each of the at least two compressors, the current corrected compressor outlet flow and also the current surge outlet flow—based on the compressor corrected speed as will be well understood by one skilled in the art. The difference between the current and surge values of the outlet flow function is used to provide the indication of surge margin. Typically surge margins are determined as a percentage but it will be appreciated that any indication of surge margin is sufficient. For some compressors, where bleed valves are located between stages of the compressor, it may be necessary to define a surge outlet flow function for different bleed settings to take account of the effect of the actual bleed setting.

The surge margin may however be determined in other ways. For example, the pressure ratio as a function of inlet flow for each of the at least two compressors may be used to determine the surge margin.

The measured engine parameters may be engine parameters that are typically measured routinely as part of the health monitoring or other control systems of the engine. In one embodiment however the apparatus comprises at least one sensor for measuring at least one parameter of the engine in use.

The apparatus may be formed as part of an engine control system. For example, the controller may be implemented within the Full Authority Digital Control System of the engine.

A gas turbine engine comprising at least two compressors may comprise an apparatus as described above. The gas turbine engine may comprise two core compressors and the apparatus may be arranged to determine an indication of surge margin for each of the two core compressors.

The gas turbine engine may have at least a first set of bleed valves, and at least one set of bleed valves may be binary bleed valves, and the apparatus may be arranged to control the operation of the at least first set of bleed valves. The apparatus may be arranged such that, during operation, the controller continuously determines an indication of surge margin for each of the at least two compressors and controls the at least first set of bleed valves to regulate the surge margins.

The present invention also applies to a method of regulating surge margins of two or more compressor of a gas turbine engine. Thus according to another aspect of the invention there is provide a method of controlling a gas turbine engine comprising at least two compressors, the method comprising the steps of: taking at least one measured engine parameter and determining, for each of at least two compressors, an indication of surge margin; and generating a control signal for controlling at least one engine variable based on all of said determined indications of surge margin.

The method of this aspect of the invention offers all of the advantages, and can be used in all of the embodiments, as described above with reference to the first aspect of the invention.

In particular the method may comprise generating bleed valve control signals for controlling at least one set of bleed valves associated with the at least two compressors. The bleed valve control signals may comprise a signal for controlling the number of bleed valves which are open in a set of binary bleed valves based on the determined indication of surge margins.

The method may comprise the step of using the indications of surge margin to determine where the current engine operating point lies in a surge margin operating map comprising a plurality of control domains and generating the control signal based on which operating domain the operating point falls within. The method may further comprise determining the distance between the current engine operating point and a defined operating line within the surge margin operating map and using the distance to determine a setting of an engine variable, such as the number of binary bleed valves in a set which are open.

Additionally or alternatively the method may comprise monitoring the duration the operating point has spent within a control domain and using said duration to determine a setting of an engine variable, such as the number of binary bleed valves in a set which are open.

The method may comprise generating one or more guide vane control signals for controlling one or more sets of variable guide vanes associated with at least one of the compressors based on the indications of surge margin. The method may comprise generating guide vane control signals only during engine transients.

The method may comprise continuously determining and monitoring the indications of surge margins for each of the at least two compressors. The method therefore provides a continuous method of active surge margin regulation for two or more compressors of a gas turbine engine.

The step of determining an indication of surge margin for a compressor may comprise determining the difference between a current flow function and a surge flow function for each compressor. The flow function may comprise a corrected compressor outlet flow function. The surge outlet flow function may be defined for each compressor as a function of compressor corrected speed.

Where at least one of the compressors has inter-stage bleed valves the method may comprise using a surge outlet flow function applicable to the current bleed setting of a compressor.

The method of the present invention may be performed by a suitable processing system in an engine controller of a gas turbine engine. For instance the method may be performed by the Full Authority Digital Control System of a gas turbine engine. In another aspect therefore the invention provides a computer program which, when run on a suitable control processor system of a gas turbine engine performs the method as described above.

The invention will now be described by way of example only, with reference to the following drawings, of which:

Figure 1:
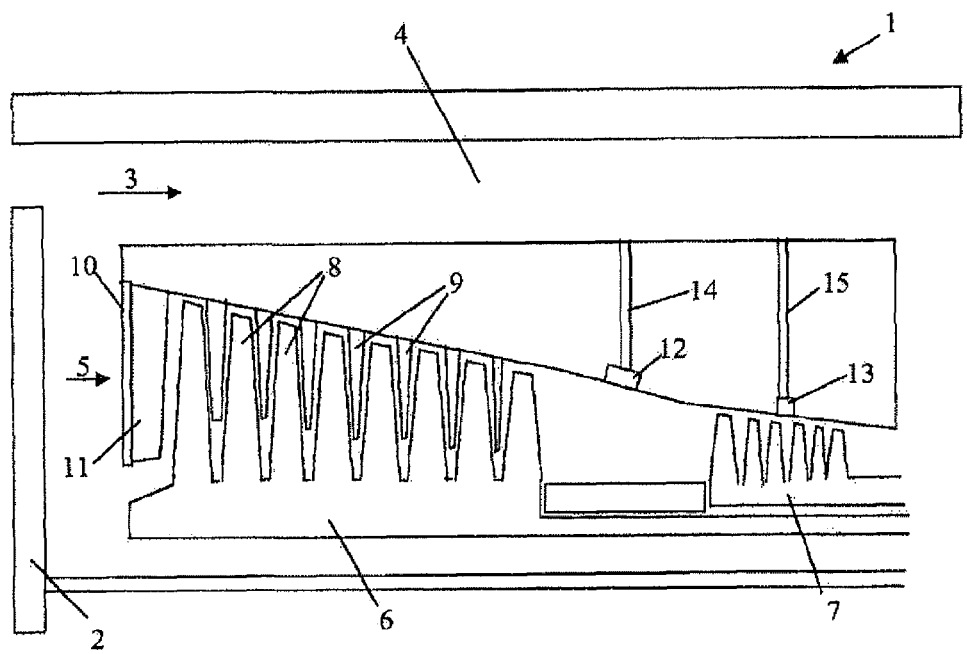
FIG. 1 illustrates a simplified section of part of a gas turbine engine.

FIG. 1 shows a simplified sectional view of part of a compression system of gas turbine engine 1. The engine shown is a turbofan or ducted fan type turbine engine, although the principles of the present invention are applicable to other types of turbine engine having two or more compressors. At the front of the engine is a fan 2. The fan is driven by a later turbine stage, not shown in the diagram, and propels air through the engine. Much of the air is directed into a by-pass flow, illustrated by arrow 3, through a bypass duct 4. The by-pass airflow ultimately exits through the back of the engine to provide thrust. Some air however is directed into a core airflow denoted by arrow 5. The core airflow passes through an intermediate pressure (IP) compressor 6 and subsequently through a high pressure (HP) compressor 7. After the HP compressor fuel is mixed into the airflow and then ignited in a combustion chamber and the resulting exhaust gases drive the turbine stages (not shown).

In some engine designs the IP compressor 6 is mounted on the same shaft or spool as the fan and thus is driven by the same downstream turbine. In other engine designs however, as illustrated in FIG. 1, each of the fan 2, IP compressor 6 and HP compressor 7 are mounted on a separate shaft each driven by a separate downstream turbine. Such a design is a three shaft, or three spool, engine design.

The IP compressor 6 comprises a series of rotor stages 8 and a series of stators 9. The inlet stators 10 are provided with variable inlet guide vanes 11 which can be trimmed to adjust compressor performance. At least some of the stators 9 may also comprise variable stator vanes (VSVs). The HP compressor also comprises a series of rotors stages and stator stages.

Each of the IP and HP compressors has a stable operating regime and a boundary representing the onset of unstable operation. The boundary is often referred to as the surge line or stall line. At operating conditions on or beyond the surge line, for instance a pressure ratio between the outlet and inlet pressure which is too high for the current mass flow, the compressor can stall. As the compressor starts to stall the airflow through the compressor can become unstable and, in the event of surge, the pressure gradient can cause reverse airflow through the compressor. Surge can lead to loss of thrust and damage to the engine and should be avoided for safe operation of the engine.

To prevent the risk of surge the engine 1 is provided with sets of bleed valves 12, 13. Each set of bleed valves comprises a plurality of valves arranged around the core which can be opened to bleed air from the core airflow. The bleed valves illustrated in FIG. 1 bleed air through channels 14, 15 to the by-pass duct 4 but other arrangements are possible and the air may be circulated to a different part of the core airflow.

Opening the bleed valves can reduce the pressure ratio for the compressor and hence can reduce the risk of surge. The bleed valves may be located after a particular compressor, for instance bleed valves 12 are positioned downstream of the IP compressor 6 (and before the HP compressor 7). Alternatively the bleed valves may be located within a compressor, for instance bleed valves 13 are located between rotor stages of the HP compressor 7.

In conventional engines the bleed valves are opened based purely on the speed of the compressors. This is a relatively crude control however and, due to the need to minimise the risk of surge, conservative values are used to decide when to open the bleed valves. This can result in inefficiency as the air pressurized by the compressor is simply vented to the bypass duct.

An embodiment of the present invention provides improved control over the bleed valves and/or other engine variables and employs active regulation of the risk of surge.

Figure 2:
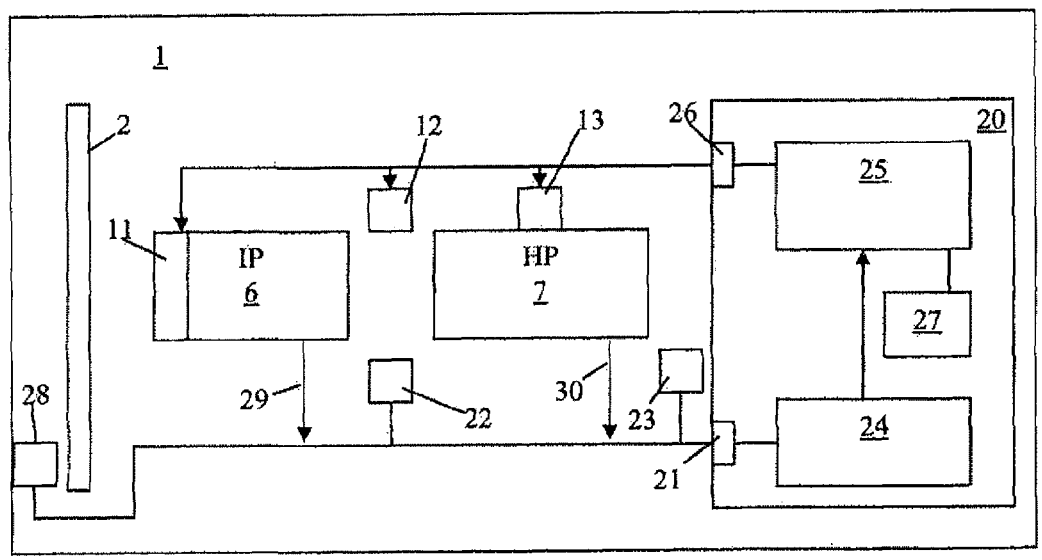
FIG. 2 illustrates an engine having an engine controller according to an aspect of the present invention.

FIG. 2 illustrates, as general functional units, the compression system of an engine 1 such as described above in relation to FIG. 1 where the same reference numerals are used to identify the same components. The engine has a fan 2, IP compressor 6 and HP compressor 7 as described above. Bleed valves 12 and 13 are arranged as described above with reference to FIG. 1. The engine also has a controller 20 for controlling engine variables to regulate the operating point of the engine.

The controller 20 has an input 21 for receiving data relating to various engine parameters from engine sensors 22 and 23. The data may relate to measured temperature, flow rate, pressure etc, at various points along the core flow, Engine sensor 28 also provides similar data measured at a point prior to the fan 2. The rotational speed of the compressors 6 and 7 is also measured and provided to the controller 20, as illustrated by arrows 29 and 30 respectively. It will be appreciated that various engine parameters are measured in the operation of the engine and used in conventional engine regulation and health monitoring and the controller 20 may thus receive at least some measured parameters that are measured in conventional engine monitoring. In one embodiment the controller 20 comprises the Full Authority Digital Control System of the engine.

The measured engine parameters are input to a surge margin calculation module 24 which estimates, for each of the IP and HP compressors, the current surge margin. Surge margin is an indication of how close the current operating conditions of the compressor are to predefined surge conditions. This embodiment of the present invention therefore directly estimates a value of surge margin independently for each of the two core compressors. As the current surge margin for each of the two compressors is known the controller can employ a control strategy that, for instance, opens bleeds valves only when they need to be opened based on the actual operating conditions of the engine. Further, the control strategy can balance the requirements of both compressors. The controller therefore actively regulates the surge margins for both of the core compressors.

The surge margin may be calculated for each compressor in a variety of ways but in general a current set of operating conditions is compared against surge valves to determine the surge margin. In one embodiment the surge margin estimates are made on the basis of corrected compressor outlet flow.

Figure 3:
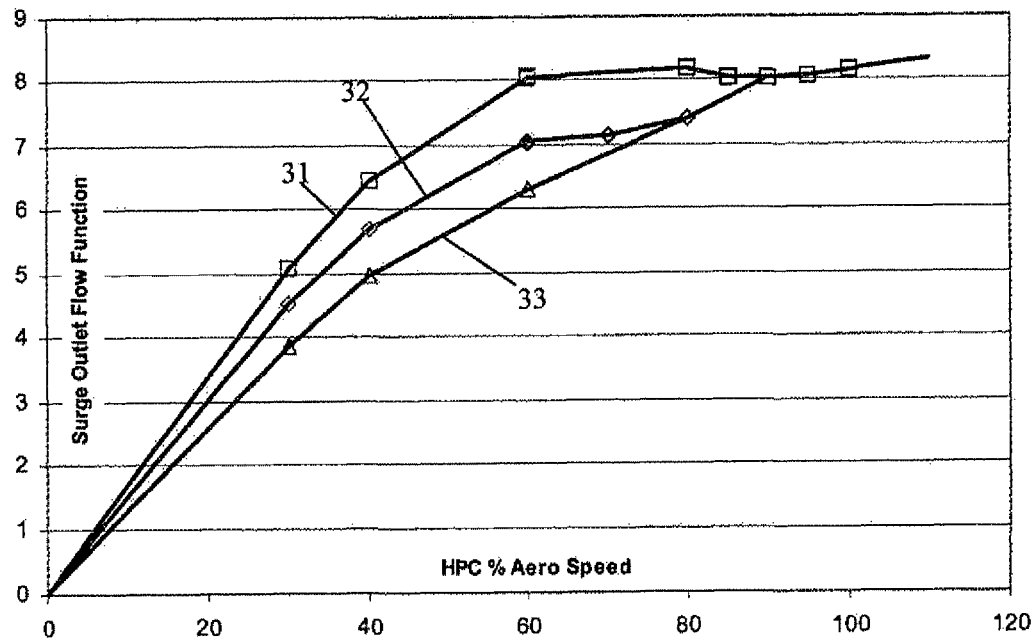
FIG. 3 illustrates the surge outlet flow function for the HP compressor as a function of corrected speed at a variety of bleed settings.

In this embodiment, for each of the IP and HP compressors, a surge outlet flow function is defined as a function of compressor corrected speed. For the HP compressor, the surge outlet flow function is defined for various bleed valve settings. This is required as these bleed valves are inter-stage rather than at compressor delivery. FIG. 3 illustrates an example of values of surge outlet flow function against HP compressor corrected speed for various bleed settings. Curves 31, 32 and 33 shows the surge outlet flow function for three different bleed settings of increasing amounts of bleed.

The surge margin calculation module 24 therefore calculates, using the measured engine parameters, a value for the actual outlet flow function for each compressor and a value for the surge outlet flow function. The difference between the values of the flow functions (usually expressed as a percentage) is an estimate of the actual surge margin for that compressor.

The current surge margin values are then input to a control signal generator 25 which generates engine control signals based on a control strategy that balances the potentially conflicting requirements of the two core compressors. The control signals are passed to an output 26 where they can be output to the various control systems of the engine. One output 26 is shown for clarity in FIG. 2 but the skilled person will appreciate that there may be many outputs for different types of control system. Also although output 26 is capable of outputting the relevant control signals it may also receive data or information from the various engine sub-systems, ie output 26 could connect to an engine control bus or the like. It will also be appreciated that the various modules of controller 20 are illustrated for the purposes of explanation only and in some embodiments a suitable programmed processor or suitable logic circuitry may be arranged to calculate the surge margins, determine an appropriate control strategy and generate the necessary control signals.

The control signals may comprise bleed valve control signals for controlling the bleed valves 12 and 13, ie for controlling the valve actuators, and also inlet guide vane control signals for controlling the variable inlet guide vanes of the IP compressor 6. Other control signals may additionally or alternatively be generated and the control signals may control any aspect of the engine variables that can be adjusted to regulate the surge margin.

The controller is preferably operable to provide continuous bleed valve control, ie optimum setting of the bleed valves such that the overall requirements of the two compressors are addressed. This bleed valve control operates continuously and pre-emptively and thus regulates the surge margins for both compressors without the need for rapid reacting, high bandwidth hardware. The controller is also preferably operable to provide variable guide vane control, ie trimming control of the variable inlet guide vanes 11 shown in FIG. 1. The variable guide vanes control may typically be applied during periods of engine transients and again the controller balances the overall needs of both compressors.

As mentioned the controller 20 implements an active regulation strategy based on balancing the requirements of the two compressors. In one embodiment the surge margins for each of the IP and HP compressors are plotted in a surge margin operating map. The surge margin operating map plots the surge margin for each compressor along one dimension. In this example the surge margin operating map is two dimensional but were the surge margins for three or more distinct compressors to be determined the operating map would have three of more dimensions.

Figure 4:
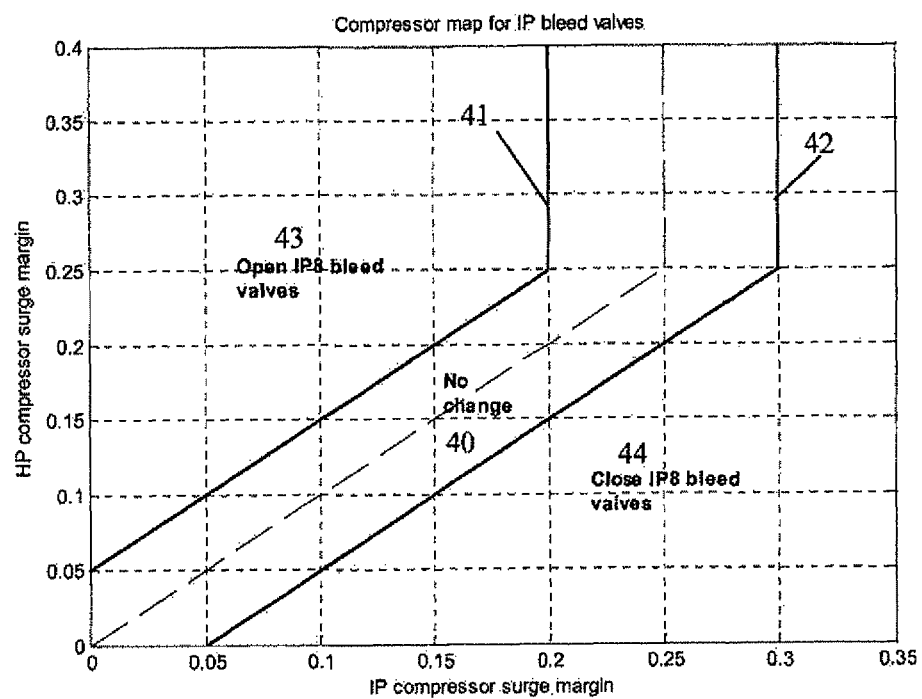
FIG. 4 illustrates a surge margin operating map with control domains for a set of bleed valves.

The surge margin operating map is divided into a number of control domains for control of at least some of the engine variables. FIG. 4 shows an example of a surge margin operating map and the control domains for control of bleed valves 12, ie the bleed valves located after the IP compressor and before the HP compressor. The surge margin for the IP compressor is plotted along the horizontal axis and the surge margin for the HP compressor is plotted along the vertical axis. The operating map is divided into three separate domains. A first domain 40, bounded by solid lines 41 and 42, is a no change domain. A second domain, 43, bounded by line 41 is an open bleed valves domain and a third domain, 44, is a close bleed valves domain.

In use the position of the current operating point of the engine is plotted onto the surge margin operating map and, based on the domain into which the operating point falls, the appropriate action is taken. If the operating point falls within the no change domain 40 the current bleed valve setting for bleed valves 12 is maintained, whatever the current setting is. If the operating point moves into the open bleed valves domain 43 a control signal for opening the bleed valves is generated. If the operating point subsequently moves into the close bleed valves domain 44 a control signal is generated to close the bleed valves.

It can be seen how the positioning of the control domains on the surge margin operating map can be used to provide a control strategy which balances the requirements of the two compressors. Recall that bleed valves 12 are located between the IP and HP compressors and that opening these bleed valves will therefore tend to reduce the pressure at the outlet of the IP compressor but also reduce the pressure at the inlet of the HP compressor. Thus opening these bleed valves can increase the surge margin for the IP compressor but at the risk of reducing the surge margin for the HP compressor.

As boundary line 42 does not extend beyond a certain value of surge margin for the IP compressor this means that bleed valves are closed whenever the IP compressor has a sufficient surge margin.

Domain 43 indicating that the bleed valves should be opened is arranged such that the bleed valves are only opened when the surge margin for the HP compressor is greater than that for the IP compressor, ie the IP compressor is closer to surge conditions and the balance of risk lies with opening the bleed valves.

The no change domain is arranged such that when both compressors have low surge margins no action is taken to disturb the status quo, at least as regards bleed valves 12. The no change domain also provides a level of hysteresis in control of the bleed valves which can stabilise operation.

It will be appreciated that there will be a separate set of control domains for control of the inter-stage HP compressor bleed valves 13. Generally opening these valves will increase the surge margin for the HP compressor and thus at low surge margin for the HP compressor the bleed valves 13 will be opened.

It will be appreciated that the principle of the control domains shown in FIG. 4 is applicable to control of bleed valves located between the IP and HP compressors of a three shaft engine architecture but the particular values and/or relative placing of the domains will vary according to the particular engine. The placing of the domains on the surge margin operating map can be based on experimental data obtained during engine testing.

The principle of an operating map as shown in FIG. 4 also allows for control of binary bleed valves. On many engine designs the actuators controlling the bleed valves are binary in nature in that a particular valve is either open or closed. The controller 20 shown in FIG. 2 is capable of generating a control signal for individual control of the binary bleed valves in a set. Each bleed valve in a set may be opened or closed individually or some bleed valves may be opened or closed together in subsets if necessary. By opening only some of the bleed valves in a set the amount of bleed achieved can be controlled.

As the current operating point of the engine moves outside the no change domain 40 of the surge margin operating map the Euclidean distance of the current operating point from the nearest boundary, lines 41 or 42, may be determined and input to an integrator module 27. A threshold value is defined for each individual bleed valve, or subset, within the set. As the integrator state reaches each threshold value the associated bleed valve is toggled. The integrator module may be implemented in hardware or software within the controller.

Note that as shown in FIG. 4 the control domains 40, 43 and 44 are continuous. For some control systems in some engine designs it is possible that there may be discrete domains that have the same control operation.

The controller 20 therefore provides continuous regulation of the surge margin in a gas turbine engine comprising two or more compressors and balances the potentially competing requirements of the compressors. The controller may be implemented within existing gas turbine control systems and use existing measured engine parameters to directly infer a surge margin for each of two or more compressors. Engine variables such as bleed valve settings can be continually adjusted as required to provide pre-emptive regulation of the surge margin for each compressor which is monitored, thus avoiding the need for very fast acting hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An apparatus for controlling a gas turbine engine comprising a plurality of compressors, the apparatus comprising:
a controller having an input for receiving at least one measured engine parameter and an output for transmitting control signals for controlling engine variables;
wherein the controller is configured to determine, from said at least one measured engine parameter, an indication of surge margin for each of at least two compressors;
a surge margin operating map, the surge margin operating map comprising;
a first dimension corresponding to the indication of surge margin in one of the at least two compressors;
a second dimension corresponding to the indication of surge margin in a second of the at least two compressors, and
a plurality of control domains;
wherein the controller is configured to use said indications of surge margin to determine a current engine operating point on the surge margin operating map, and
wherein the controller is configured to generate at least one control signal for controlling at least one engine variable based on the location of the current engine operating point on the surge margin operating map.

2. An apparatus as claimed in claim 1 wherein said at least one control signal comprises a bleed valve control signal for control of at least one set of bleed valves of the gas turbine engine.

3. An apparatus as claimed in claim 2 wherein the bleed valve control signal controls the number of bleed valves which are open in said at least one set of bleed valves based on the determined indication of surge margins.

4. An apparatus as claimed in claim 1 wherein the surge margin operating map comprises an open bleed valves control domain and a close bleed valves control domain for at least one set of bleed valves.

5. An apparatus as claimed in claim 4 wherein the controller is arranged to generate a bleed valve control signal based on the position of the current operating point within a control domain of the surge margin operating map.

6. An apparatus as claimed in claim 4 wherein the controller is arranged to generate a bleed valve control signal based on a distance of the current operating point from a boundary line of the control domain and the time spent in a particular control domain.

7. An apparatus as claimed in claim 1 wherein the controller is configured, during engine operation, to continually determine an indication of surge margin for each of the at least two compressors and generate control signals based on the location of the current engine operating point on the surge margin operating map.

8. A gas turbine engine comprising at least two compressors and an apparatus as claimed in claim 1.

9. A gas turbine engine as claimed in claim 8 comprising two core compressors wherein said apparatus is arranged to determine an indication of surge margin for each of the two core compressors.

10. A gas turbine engine as claimed in claim 8 comprising at least a first set of binary bleed valves wherein said apparatus is arranged to control the operation of the at least first set of binary bleed valves.

11. A method of controlling a gas turbine engine comprising at least two compressors, the method comprising the steps of:
taking at least one measured engine parameter;
determining, for each of the at least two compressors, an indication of surge margin;
using the indications of surge margin to determine where a current engine operating point lies on a surge margin operating map comprising a first dimension corresponding to the indication of surge margin in one of the at least two compressors, a second dimension corresponding to the indication of surge margin in a second of the at least two compressors, and a plurality of control domains, and
generating a control signal for controlling at least one engine variable based on which control domain the operating point falls within.

12. A method as claimed in claim 11 comprising generating bleed valve control signals for controlling at least one set of bleed valves associated with the at least two compressors.

13. A method as claimed in claim 12 wherein the bleed valve control signals comprise a signal for controlling the number of bleed valves which are open in a set of binary bleed valves based on the determined indication of surge margins.

14. A method as claimed in claim 13 further comprising determining the distance between the current engine operating point and a defined operating line within the surge margin operating map and using the distance to determine the number of binary bleed valves in a set which are open.

15. A method as claimed in claim 13 further comprising monitoring the duration the operating point has spent within a control domain and using said duration to determine the number of binary bleed valves in a set which are open.

16. A computer program, which, when run on a control processor system of a gas turbine engine, performs the method according to claim 11.

* * * * *